(12) United States Patent
Gold et al.

(10) Patent No.: US 7,533,169 B1
(45) Date of Patent: May 12, 2009

(54) OBJECT-DRIVEN VISUALIZATION MECHANISM FOR ZONING INFORMATION ON A STORAGE AREA NETWORK

(75) Inventors: Daniel Gold, Somerville, MA (US); Kavita Gupta, North Reading, MA (US)

(73) Assignee: Symantec Operating Corporation, Mountain View, CA (US)

( * ) Notice: Subject to any disclaimer, the term of this patent is extended or adjusted under 35 U.S.C. 154(b) by 894 days.

(21) Appl. No.: 10/743,370

(22) Filed: Dec. 22, 2003

(51) Int. Cl.
*G06F 15/177* (2006.01)

(52) U.S. Cl. .................. 709/224; 709/223; 715/734

(58) Field of Classification Search .............. 709/212, 709/223–224; 715/734–736, 738
See application file for complete search history.

(56) References Cited

U.S. PATENT DOCUMENTS

| | | | |
|---|---|---|---|
| 6,636,239 B1 | 10/2003 | Arquie et al. | |
| 7,072,986 B2* | 7/2006 | Kitamura et al. | 709/249 |
| 7,194,538 B1* | 3/2007 | Rabe et al. | 709/224 |
| 7,328,260 B1* | 2/2008 | Muthiyan et al. | 709/224 |
| 2003/0085914 A1 | 5/2003 | Takaoka et al. | |
| 2003/0130821 A1* | 7/2003 | Anslow et al. | 702/186 |
| 2003/0149762 A1* | 8/2003 | Knight et al. | 709/224 |
| 2003/0167327 A1 | 9/2003 | Baldwin et al. | |
| 2003/0195956 A1* | 10/2003 | Bramhall et al. | 709/223 |
| 2003/0233427 A1* | 12/2003 | Taguchi | 709/220 |
| 2004/0024887 A1* | 2/2004 | Grabauskas et al. | 709/229 |

OTHER PUBLICATIONS

"EMC VisualSAN Network Management Suite," $EMC^2$, Aug. 2003, (6 pages).
"Brocade Advanced Zoning," Brocade, Feb. 2003, (2 pages).
"Brocade Web Tools," Brocade, Jun. 2001, (4 pages).
"Prisa Networks to Showcase New Intelligent SAN Monitoring Software," Prisa Networks—News Release, May 7, 2001, (2 pages).
Keith R. Kammer, "Managing Small-to Medium-Size SANs with EMC VisualSAN," www.dell.com/powersolutions, Feb. 2003, (4 pages).
"Zoning Implementation Strategies for Brocade SAN fabrics," Brocade, Jan. 2003, (13 pages).
John Vacca, "Flexible SAN management through Zoning," http://www.enterprisestorageforum.com/sans/features/print.php/11188_1583811_1, Feb. 13, 2003, (9 pages).
Chris King, "Zoning: The Key to Flexible SAN Management," Qlogic White Paper, 2002, (8 Pages).

* cited by examiner

*Primary Examiner*—Ario Etienne
*Assistant Examiner*—Philip J Chea
(74) *Attorney, Agent, or Firm*—Robert C. Kowert; Meyertons, Hood, Kivlin, Kowert & Goetzel, P.C.

(57) ABSTRACT

System and method for object-centric Storage Area Network (SAN) zoning visualization. Embodiments may provide graphical and/or textual displays and reporting of logical and/or physical zone and zone alias information for SAN objects to users or administrators of a SAN. SAN objects may include any logically or physically zonable SAN component. Embodiments may graphically and/or textually present logical and/or physical zoning information for any SAN object via real-time displays and/or reporting in response to selecting the object. All of the zones, and zone aliases, if any, of which a SAN object is a logical and/or physical member may be determined and displayed, along with other relevant information including the mechanisms by which the SAN object is logically zoned. Embodiments may provide mechanisms through which a user may navigate through the displayed zoning information to view zoning information for other SAN objects and/or zone-centric information for the zones and zone aliases.

40 Claims, 13 Drawing Sheets

Zone Membership

| Zone  | Fabric  | Zoned By          | Membership |
|-------|---------|-------------------|------------|
| zone1 | fabric1 | port1 on HBA1     | ACTIVE     |
| zone2 | fabric1 | node1 on HBA1     | ACTIVE     |
| zone2 | fabric1 | zone alias1       | ACTIVE     |
| zone3 | fabric1 | port 01 on Switch1| ACTIVE     |

*FIG. 2A*

Zone Alias Membership

| Zone Alias  | Fabric  | Zone Aliased By | Membership |
|-------------|---------|-----------------|------------|
| zone alias1 | fabric1 | port1 on HBA1   | ACTIVE     |
| zone alias1 | fabric1 | node1 on HBA1   | ACTIVE     |
| zone alias2 | fabric1 | port1 on HBA1   | ACTIVE     |

*FIG. 2B*

Zone Membership

| Zone  | Fabric  | Zoned By          | Membership |
|-------|---------|-------------------|------------|
| zone1 | fabric1 | port1 on HBA1     | ACTIVE     |
| zone2 | fabric1 | node1 on HBA1     | ACTIVE     |
| zone2 | fabric1 | zone alias1       | ACTIVE     |
| zone3 | fabric1 | port 01 on Switch1| ACTIVE     |
| zone4 | fabric1 | node1 on HBA2     | ACTIVE     |

*FIG. 3A*

Zone Alias Membership

| Zone Alias  | Fabric  | Zone Aliased By | Membership |
|-------------|---------|-----------------|------------|
| zone alias1 | fabric1 | port1 on HBA1   | ACTIVE     |
| zone alias1 | fabric1 | node1 on HBA1   | ACTIVE     |
| zone alias2 | fabric1 | port1 on HBA1   | ACTIVE     |

*FIG. 3B*

*Zone Membership*

| Zone | Fabric | Zoned By | Membership |
|---|---|---|---|
| zone1 | fabric1 | port1 on HBA1 | ACTIVE |
| zone2 | fabric1 | node1 on HBA1 | ACTIVE |
| zone2 | fabric1 | zone alias1 | ACTIVE |
| zone3 | fabric1 | port 01 on Switch1 | ACTIVE |

FIG. 4A

*Zone Alias Membership*

| Zone Alias | Fabric | Zone Aliased By | Membership |
|---|---|---|---|
| zone alias1 | fabric1 | port1 on HBA1 | ACTIVE |
| zone alias1 | fabric1 | node1 on HBA1 | ACTIVE |
| zone alias2 | fabric1 | port1 on HBA1 | ACTIVE |

FIG. 4B

*Zone Membership*

| Zone | Fabric | Zoned By | Membership |
|---|---|---|---|
| zone1 | fabric1 | port0 | ACTIVE |
| zone2 | fabric1 | zone alias1 | ACTIVE |
| zone3 | fabric1 | port 02 on Switch1 | ACTIVE |

FIG. 5A

*Zone Alias Membership*

| Zone Alias | Fabric | Zone Aliased By | Membership |
|---|---|---|---|
| zone alias1 | fabric1 | port0 | ACTIVE |
| zone alias2 | fabric1 | port0 | ACTIVE |

FIG. 5B

*Zone Membership*

| Zone | Fabric | Zoned By | Membership |
|---|---|---|---|
| zone1 | fabric1 | port0 on Array0 | ACTIVE |
| zone2 | fabric1 | zone alias1 | ACTIVE |
| zone3 | fabric1 | port 02 on Switch1 | ACTIVE |
| zone4 | fabric1 | port1 on Array0 | INACTIVE |
| zone4 | fabric1 | zone alias3 | INACTIVE |

*FIG. 6A*

*Zone Alias Membership*

| Zone Alias | Fabric | Zone Aliased By | Membership |
|---|---|---|---|
| zone alias1 | fabric1 | port0 on Array0 | ACTIVE |
| zone alias2 | fabric1 | port0 on Array0 | ACTIVE |
| zone alias3 | fabric1 | port1 on Array0 | INACTIVE |

*FIG. 6B*

OBJECT-DRIVEN VISUALIZATION MECHANISM FOR ZONING INFORMATION ON A STORAGE AREA NETWORK

BACKGROUND OF THE INVENTION

1. Field of the Invention

This invention is related to the field of storage management and, more particularly, to software used in storage management.

2. Description of the Related Art

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices. The versatility of the SAN model enables organizations to perform tasks that were previously difficult to implement, such as LAN-free and server-free tape backup, storage leasing, and full-motion video services.

The flexible connectivity capabilities of the SAN storage model may pose security risks. Fabric zoning helps alleviate that risk by providing a method of controlling access between objects on the SAN. A zone is a set of objects within a SAN fabric that can access one another. By creating and managing zones, the administrator or other user may control host access to storage resources. An administrator or other user may create and manage zones of SAN objects, including zones of heterogeneous components. Zones and their member objects may be defined, for example, in zoning tables within the switches on the SAN fabric. When zoning is implemented on a SAN fabric, the switches consult the zoning table to determine whether one object is permitted to communicate with another object, and restrict access between them unless they share a common membership in at least one zone. Fabric zoning occurs at the level of individual nodes or ports attached to the SAN fabric. There may be no industry-wide standard for zoning, and thus different vendors' switches may implement switch zoning in different ways. In one embodiment, a SAN management system such as the one described below may include one or more tools and/or utilities for creating and managing zones including heterogeneous SAN objects.

Zones cannot be nested, and typically, there is no hierarchical organization within a zone. Zone aliases are logical entities that do not have a WWN. Zone aliases are a grouping mechanism for SAN objects. Any SAN object that can be added to a zone may also be added to a zone alias, and then the zone alias may be added to a zone. Instead of having to place everything together in a zone, zone aliases allow a user to group objects within a zone to partition the zone into logical subgroups. Zone aliases allow levels of subgroups within zones, as zone aliases can be added to zones. Zone alias does not do access control. When a zone alias is added to a zone, the access control is performed.

SAN administrators use zoning to control access to storage. Switch vendors may provide software with their switches that allow users to manage switches. Zoning is one of the primary operations. Switch vendor software may allow a user to create zones and add objects with WWNs to zones, for example, ports on an HBA card, ports on a switch ports on an enclosure, or nodes on an HBA card. Depending on a switch's capabilities, switch ports, objects with WWNs, and zone aliases may be zoned. Zoning these objects effectively controls access for the high-level objects on the SAN such as HBAs, hosts and arrays.

Zoning may be performed using hardware zoning and/or software zoning. Hardware zoning includes soft zoning and hard zoning. Soft zoning, also called advisory zoning, may be enforced simply by filtering the visibility of SAN objects on the SAN so that a SAN object can only see other SAN objects that share at least one zone membership with the SAN object. In hard zoning, a Fibre Channel switch may actively block access to zone members from any SAN objects outside the zone. This may be performed at the level of ports on the switches. Hard zoning may also be referred to as switch port zoning. Software zoning may be implemented through software (e.g., Simple Name Server (SNS)) in a fabric switch. Software zoning may use World Wide Node Names and/or World Wide Port Names to define members of zones.

A SAN object added to a zone via a WWN using one of these hardware or software zoning methods may be considered conventionally, or physically, zoned. Similarly, SAN objects added to zone aliases may be considered conventionally or physically zoned in the zone alias. SAN objects may also be considered logically zoned in zones and/or zone aliases, as opposed to physically zoned, by virtue of some relationship it has with one or more other physically zoned SAN objects. A low-level SAN object (e.g., a LUN) may, for example, be a logical member of a zone or zone alias if another low-level SAN object (e.g. an array port) to which it is connected (or bound, in the case of a LUN) is a physical member of the zone or zone alias. A high-level SAN object (e.g. an HBA or a host) may, for example, be a logical member in a zone if a low-level SAN object (e.g. a port on the HBA) associated with the high-level SAN object is a physical or logical member of the zone. Similarly, a high-level SAN object may, for example, be a logical member of a zone alias if a low-level SAN object associated with the high-level SAN object is a physical member of the zone alias. Further, a SAN object may be a logical member of a zone through physical or logical membership in a zone alias.

Determining logical zone membership of SAN objects is complex and may require customization for each SAN object. Switch vendor software may provide mechanisms to display a switch's zoning table, but this software typically only provides information about the particular switches the vendor supplies, and does not typically provide much if any zoning information about other low-level SAN objects or logical zoning information, such as logical zone membership information for high-level SAN objects.

SUMMARY

Embodiments of a system and method for object-centric Storage Area Network (SAN) zoning visualization are described. Embodiments may provide graphical and/or textual displays and reporting of logical and/or physical zone and zone alias information for SAN objects to users or administrators of a SAN. SAN objects may include any logically or physically zonable SAN component. Embodiments may graphically and/or textually present physical and/or logical zoning information for any object on the SAN via real-time displays and/or reporting in response to selecting the SAN object. As used herein, "zoning information" for a SAN object may refer to logical and/or physical zoning information, for zones and/or zone aliases, for the SAN object. All of the zones, and zone aliases, if any, of which a SAN object is a logical and/or physical member may be determined and displayed, along with other relevant information, for example the mechanisms by which the SAN object is logically zoned and whether the object's physical fabric connections make it "active" in each zone or zone alias. As used herein, "member" and "membership" for a SAN object may refer to logical and/or physical membership in a zone or zone alias.

One embodiment of a system and method for object-centric SAN zoning visualization may be implemented as a zone visualization mechanism on one or more systems coupled to a SAN. In one embodiment, the zone visualization mechanism may obtain SAN zoning information for a plurality of high- and low-level SAN objects in a SAN including one or more host systems, one or more storage devices, and one or more fabrics. In one embodiment, the zone visualization mechanism may collect SAN information, including SAN object, zoning and other information, from one or more sources. In one embodiment, the zone visualization mechanism may discover various cross-vendor, heterogeneous objects on the SAN, and collect at least a part of the SAN information from the SAN objects. In other embodiments, the zone visualization mechanism may collect at least a part of the SAN information from other sources, for example from a SAN management system such as the exemplary SAN management system described below.

The zone visualization mechanism may display logical and/or physical zoning information for a selected SAN object in the SAN. In one embodiment, the displayed zoning information may indicate one or more zones of the SAN of which the selected SAN object is a physical and/or logical member. In one embodiment, the displayed zoning information may indicate one or more zone aliases of the SAN of which the selected SAN object is a member. In one embodiment, the displayed zoning information for each zone or zone alias of which the selected SAN object is a logical member may indicate one or more other SAN objects through which the selected SAN object is logically connected to the zone or zone alias. In one embodiment, the zoning information for the selected SAN object in the SAN may be displayed in graphical format or textual format according to user preference.

Embodiments of the zone visualization mechanism may provide mechanisms through which a user may navigate through the displayed zoning information to view logical and/or physical zoning information for other SAN objects and/or logical and physical zone-centric information for the zones and zone aliases. In one embodiment, the other SAN object through which the selected SAN object is logically connected to a zone or zone alias may be user-selectable to display zoning information for the other SAN object indicating one or more zones, and zone aliases if any, of the SAN of which the other SAN object is a member.

In one embodiment, the indicated one or more zones and/or zone aliases of the SAN of which the selected SAN object is a member may be user-selectable to display zone-centric information for the selected zone or zone alias, including logical zoning information. The zone-centric information for a zone or zone alias may indicate one or more SAN objects that are logical and/or physical members of the zone or zone alias and relationships among the one or more SAN objects. The one or more other SAN objects may be user-selectable to display SAN object-centric zoning information for the SAN objects indicating the one or more zones of the SAN of which the selected SAN object is a logical and/or physical member. In one embodiment, the zone-centric information for a selected zone or zone alias may be displayed in graphical format or textual format according to user preference.

BRIEF DESCRIPTION OF THE DRAWINGS

The following detailed description makes reference to the accompanying drawings, which are now briefly described.

FIGS. 2A through 6B illustrate exemplary tabular SAN object-centric logical and physical zoning information that may be presented in SAN object-centric zoning views by the zone visualization mechanism according to one embodiment.

Figure 1:
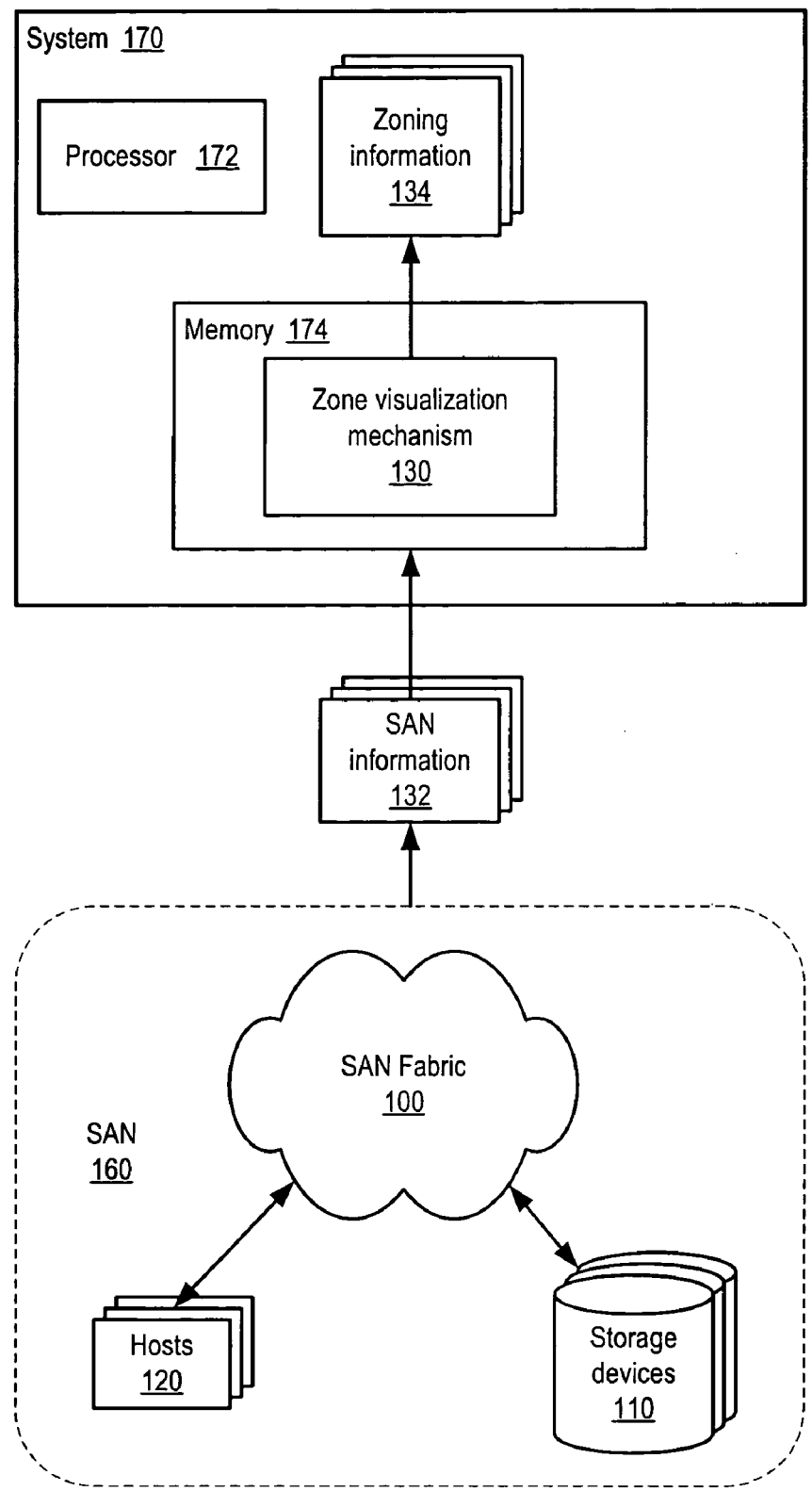
FIG. 1 illustrates a system implementing an embodiment of a zone visualization mechanism for object-centric Storage Area Network (SAN) visualization according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for object-centric Storage Area Network (SAN) zoning visualization are described. Embodiments may provide SAN object-centric mechanisms for viewing end-to-end zoning information in a SAN. SAN objects may include any logically or physically zonable SAN component. Embodiments may allow a user or administrator to graphically and/or textually view both logical and physical zoning information for SAN objects. Embodiments may allow a user or administrator to display SAN object-centric zoning information to assist the user in conceptualizing zoning operations and determining the logical and physical ramifications of a zoning operation on a low-level SAN object, e.g. a port or node, on the high-level SAN object that contains the low-level SAN object, e.g. a switch, Host Bus Adapter (HBA), or storage device.

Embodiments may provide graphical and/or textual displays and reporting of logical and/or physical zone and zone alias information for SAN objects to users or administrators of a SAN. Embodiments may graphically and/or textually present physical and/or logical zoning information for any object on the SAN via real-time displays and/or reporting in response to selecting the SAN object. As used herein, "zoning information" for a SAN object may refer to logical and/or physical zoning information, for zones and/or zone aliases, for the SAN object. All of the zones, and zone aliases, if any, of which a SAN object is a logical and/or physical member may be determined and displayed, along with other relevant information, for example the mechanisms by which the SAN object is logically zoned and whether the object's physical fabric connections make it "active" in each zone or zone alias. As used herein, "member" and "membership" for a SAN object may refer to logical and/or physical membership in a zone or zone alias.

One embodiment may display SAN object-centric zoning information in tabular format or table-based views. Other embodiments may use other textual formats to display SAN object-centric zoning information, such as list views. One embodiment may display topological physical and/or logical zoning information in graphical format that graphically displays the physical and logical relationship(s) among SAN objects in a zone. One embodiment may provide both tabular and graphical views of SAN object-centric zoning information. In one embodiment, the zone visualization mechanism may be implemented as a Web-based application.

In one embodiment, active zone sets and inactive zone sets, if any may be viewed. One embodiment may include a table or column on the SAN object-centric zoning view indicating the active and inactive zones, if any, that the SAN object participates in.

In a SAN object-centric zoning view for a SAN object, embodiments may provide a mechanism or mechanisms, for example links, for the user to navigate to other SAN object-centric zoning views for the SAN object, to SAN object-centric zoning views for other SAN objects in the views, and/or to zone-centric views for zones and zone aliases of which the SAN object is a member or zones and zone aliases of which other SAN objects in the views are members. From a SAN object-centric zoning view for a SAN object, embodiments may allow the user to select a zone or zone alias of which the SAN object is a member to display zone-centric information for the selected zone, including all the SAN objects that are participating in the zone, and to select other zones and zone aliases of which other SAN objects in the zone are members to display zone-centric information for the other zones or zone aliases. In one embodiment, every SAN object, zone, and zone alias displayed on a SAN object-centric zoning view or a zone-centric view may be user-selectable to link to a relevant view or views for the selected SAN object, zone or zone alias.

As used herein, SAN objects may include any low-level SAN object that can be physically zoned through hardware or software zoning or logically zoned, and any high-level SAN object that can be logically zoned. High-level SAN objects may include one or more of, but are not limited to: host systems, HBAs, fabric devices such as switches, hubs, and routers, and storage devices such as RAID (Redundant Array of Independent Disks) systems, disk arrays, JBODs (Just a Bunch Of Disks, used to refer to disks that are not configured according to RAID), tape devices, and optical storage devices. Low-level SAN objects may include one or more of, but are not limited to: nodes, LUNs, HBA ports, switch ports, ports on storage devices, or ports on other devices such as hubs and routers.

FIGS. 1 through 8 illustrate means for obtaining zoning information for a plurality SAN objects in a SAN, means for displaying zoning information for a selected SAN object in the SAN indicating one or more zones of the SAN of which the selected SAN object is a member. The displayed zoning information for each zone of which the selected SAN object is a member may further indicate another SAN object through which the selected SAN object is connected to the zone, and FIGS. 1 through 8 further illustrate means for displaying zoning information for the other SAN object that indicates one or more zones of the SAN of which the other SAN object is a member. FIGS. 1 through 8 further illustrate means for displaying zone-centric information for the indicated one or more zones of the S-AN of which the selected SAN object is a member indicating one or more SAN objects that are members of the zone and relationships among the one or more SAN objects that are members of the zone.

One embodiment of a system and method for object-centric SAN zoning visualization may be implemented as a zone visualization mechanism on one or more systems coupled to a SAN. FIG. 1 illustrates a system implementing an embodiment of a zone visualization mechanism for object-centric SAN visualization according to one embodiment. System 170 may be any of various types of devices, including, but not limited to, a server computer system, personal computer system, desktop computer, laptop or notebook computer, mainframe computer system, workstation, network computer, or other suitable device. System 170 may include at least one processor 172. The processor 172 may be coupled to a memory 174. Memory 174 is representative of various types of possible memory media, also referred to as "computer readable media."Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 170 may couple over a network or networks to one or more other devices via one or more wired or wireless network interfaces (not shown). System 170 may also include one or more display devices (not shown) and/or one or more user input devices for accepting user input.

Figure 9:
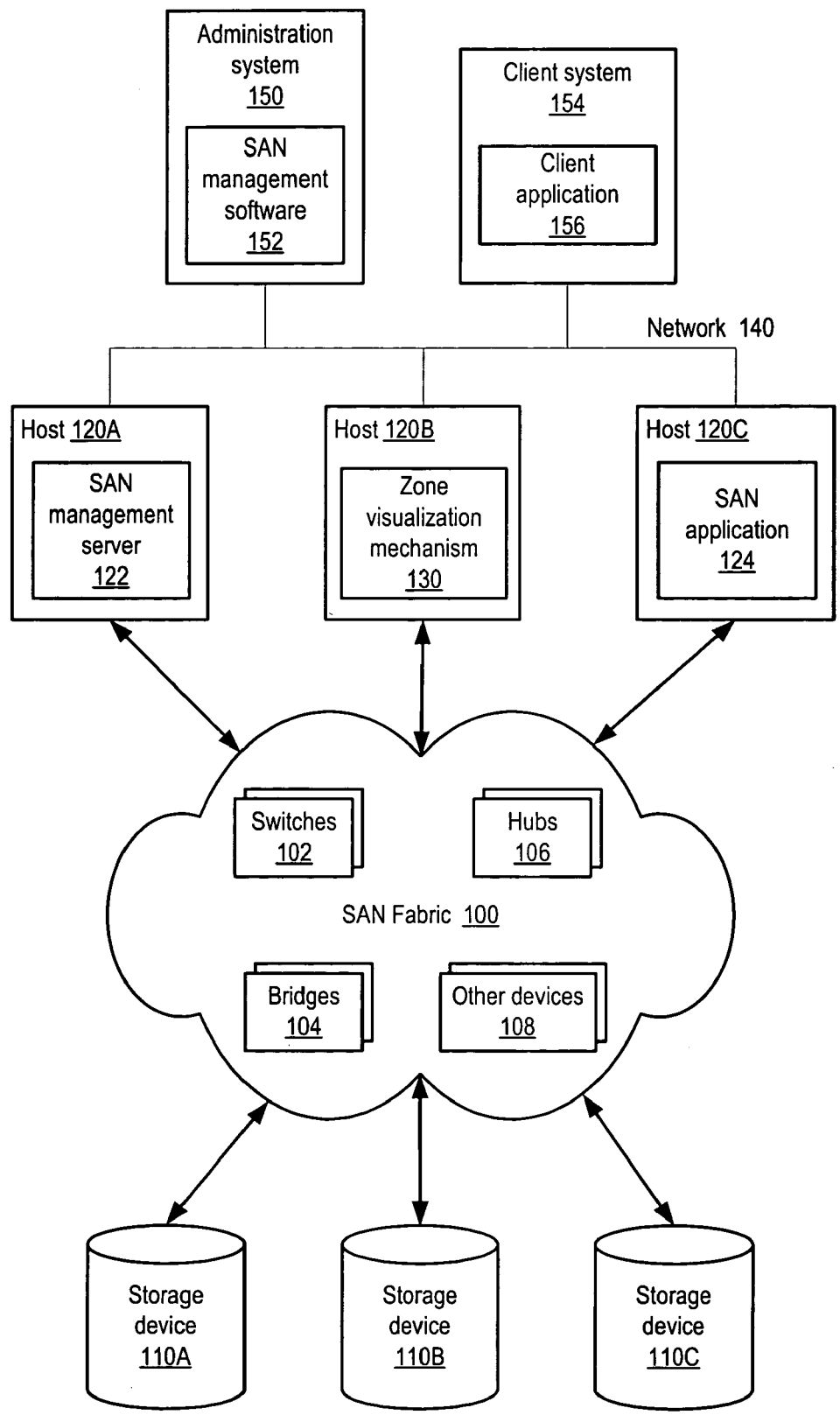
FIG. 9 illustrates an exemplary SAN implementing an embodiment of a zone visualization mechanism for object-centric SAN visualization according to one embodiment.

System 170 may include, in memory 174, a zone visualization mechanism 130 that may be used to obtain SAN object, zoning and other information for a SAN including heterogeneous SAN objects from one or more vendors, such as SAN 160, and display object-centric zone and/or zone alias information for the SAN 160. In one embodiment, zone visualization mechanism 130 may be a stand-alone application. In one embodiment, zone visualization mechanism 130 may be a component or feature of another application, for example of a SAN management system such as the exemplary SAN management system described below. In one embodiment, zone visualization mechanism 130 may be a Web-based application. Note that, while FIG. 1 shows zone visualization mechanism 130 on a system 170 external to SAN 160, in one embodiment, zone visualization mechanism 130 may reside on a host 120 system within a SAN 160, for example as illustrated in FIG. 9.

In one embodiment, zone visualization mechanism 130 may collect SAN information 132, including SAN object, zoning and other information, from one or more sources. In one embodiment, zone visualization mechanism 130 may discover various cross-vendor, heterogeneous objects on the SAN, and collect at least a part of the SAN information 132 from the SAN objects. In other embodiments, zone visualization mechanism 130 may collect at least a part of the SAN information 132 from other sources, for example from a SAN management system such as the exemplary SAN management system described below.

Zone visualization mechanism 130 may then process the SAN information 132 to determine zone and/or zone alias information for particular SAN objects, and may display SAN object-centric zoning information 134 for one or more potentially heterogeneous SAN objects in graphical and/or textual formats on one or more display devices, and/or to generate one or more SAN object-centric zoning reports. Zoning information 134 may include, but is not limited to, logical zone and/or zone alias information for SAN objects in the SAN 160.

Zone visualization mechanism 130 may provide zone-centric and SAN object-centric zoning views of the SAN. Zone visualization mechanism 130 may provide one or more views to visualize the SAN, for example graphical and/or textual displays, and one or more mechanisms to navigate through the objects on the SAN to other SAN object-centric zoning views for other SAN objects and/or for zone-centric views for zones and zone aliases. In one embodiment, zone visualization mechanism 130 may provide one or more mechanisms for a user to select or switch between graphical and textual views of zone-centric and/or SAN object-centric information.

Zone visualization mechanism 130 may provide the ability to view end-to-end zoning information for a SAN in zone-centric or SAN object-centric zoning views. Zone visualization mechanism 130 may provide a SAN object-centric zoning view that allows the user to traverse the SAN and stop at any SAN object, whether the SAN object is a high-level object such as a host, switch, or array, or a low-level object such as a port or node. From a selected SAN object's point of view, zone visualization mechanism 130 may allow the user to visualize and understand the object's relationship to the rest of the SAN, including, but not limited to, any zones and/or zone aliases of which the object is a member, and the relationships to other SAN objects through which the SAN object is participating in the zone.

When a user is traversing the objects on a SAN in the zone visualization mechanism 130's user interface, from any SAN object's point of view, the user can use the interface of the zone visualization mechanism 130 to view the zones and the zone aliases in which the SAN object is participating. In one embodiment, zone visualization mechanism 130 does not display other zones in the SAN that the host or other currently selected SAN object is not participating in, but only the zones that the host or other SAN object participates in relative to that view.

Zone visualization mechanism 130 provides SAN object-centric views of zoning in a SAN. When viewing a SAN object, for example a host, zone visualization mechanism 130 may allow the user to go to a zoning view for the object that provides information about the zone(s) and/or zone aliases in which the object is participating. Zone visualization mechanism 130 may also display information describing whether the SAN object is active or inactive. Zone visualization mechanism 130 may allow the user to graphically and/or textually view information about how a SAN object is in a zone, for example if the SAN object is in the zone through a connection to another SAN object (e.g. a switch port). For example, when viewing a host object, the host may contain an HBA, and the HBA may have a port that is connected to a switch port that is in the zone. The SAN object-centric zoning view for the host may display the zone, the HBA, the HBA port, and the switch port, each of which may be user-selectable to display, for the zone, a zone-centric view, and for the SAN objects (HBA, HBA port, and switch port), a SAN object-centric zoning view.

In one embodiment, the user interface of the zone visualization mechanism 130 may, in an object-centric zoning view for a SAN object, provide links to SAN object-centric zoning views for other SAN objects, and links to zone-centric views for zones and zone aliases in which the SAN object is participating. From the SAN object-centric zoning view provided by zone visualization mechanism 130, a user can drill down to the zone and see the same host along with any other SAN objects in zone in zone-centric graphical or textual views of end-to-end zoning information for the SAN. For example, a user may see in a SAN object-centric zoning view for a host that the host is in Zone A. To see what else is in Zone A, the user may select Zone A to view a zone-centric view for Zone A that shows all of the SAN objects that are in the zone.

One embodiment may provide table-based views for SAN objects, zones and zone aliases. These tables may reference other SAN objects, zones and zone aliases. In one embodiment, each table cell may represent a SAN object, zone or zone alias, or may represent two or more SAN objects, zones, and/or zone aliases. In one embodiment, each cell, or each SAN object, zone, or zone alias represented in a cell, may be user-selectable, e.g. via a link or an icon, to go to a relevant view or views for the SAN object, zone or zone alias represented by or in the cell. In one embodiment, a SAN object-centric view for a SAN object may include a link, links, or other user interface mechanism to view zoning information for the SAN object. For example, if the current SAN object being viewed is a host object, the user may select a link to go to a SAN object-centric zoning view for the host to view the zones that the host participates in, and also the zone aliases, if any, that the host participates in. In one embodiment, the SAN object-centric zoning view may include tables that display the zones and zone aliases, if any, in which the SAN object is participating.

In one embodiment, when the user selects a zone or zone alias in a zone-centric view or SAN object-centric zoning view, there may be two types of views available; a tabular view that lists all the logical members in the zone, and a graphical topology view that shows the relationships of the SAN objects in that zone. A topological zone-centric view graphically displays SAN objects that are members of the zone and interconnects between the SAN objects.

In one embodiment, relationships among SAN objects may be viewed graphically and/or textually. For example, a user may want to determine how a host is in a particular zone (e.g. through what switch port). In one embodiment, in a topological zoning view for a SAN object, relationships among SAN objects in a zone may be graphically displayed. In the graphical display, SAN objects displayed graphically may be user-selected to navigate to graphical and/or textual SAN object-centric zoning information for the selected SAN object. In a tabular zoning view for a SAN object, there may be a column that represent SAN objects through which the current SAN object is connected to zones and/or zone aliases of which this SAN object is a member. For a zone, this column may indicate the SAN object through which the current SAN object is a member in the zone, or a zone alias of which the current SAN object is a member and through which this SAN object is a member in the zone. For example, in the zoning table for a host, there may be a column representing the SAN objects through which the host is connected to the zones in which it participates. The table may indicate that the host participates in a particular zone through a particular switch port. The user may select the particular switch port in the table to link to SAN object-centric zoning information for the switch port. The user will be taken to the zoning view for that switch port to view all the zones that that switch port participates in.

FIGS. 2A through 6B illustrate exemplary tabular SAN object-centric logical and physical zoning information that may be presented in SAN object-centric zoning views by the zone visualization mechanism according to one embodiment. In one embodiment, SAN object-centric zoning information for all zoneable SAN objects may be viewed in a tabular zoning view including, but not limited to, a zone membership table and a zone alias membership table. These tables may include a row for each zone, for the zone membership table, or zone alias, for the zone alias membership table, in which the current object is a logical or physical member. Each of these tables may include two or more columns that may include, but are not limited to, columns that represent the name of the zone or zone alias in which the current SAN object is a logical or physical member, the name of the fabric that the zone or zone alias is in, the SAN object (or zone alias) through which the current SAN object is a member of the zone or zone alias, and the current SAN object's membership status in the zone or zone alias (active or inactive).

The exemplary tables of FIGS. 2A through 6B are based on an exemplary SAN including the following SAN objects with the listed subobjects.
    fabric1:
        Switch1:
            port 01 (connected to port1 on HBA1 on Host1)
            port 02 (connected to port0 on Array0)
        Host1:
            HBA1 (port1 connected to Switch1 port 01)
            HBA2
        Array0:
            port0 (connected to port 02 on Switch1)
            port1 (connected to another fabric)
            LUN0 (bound to port0)
        ZONE1:
            port1 on HBA1 on Host1
            port0 on Array0
        ZONE2:
            node1 on HBA1 on Host1
            zone alias1
        ZONE3:
            port 01 on Switch1
            port 02 on Switch1
        ZONE4:
            node1 on HBA2 on Host1
            port1 on Array0
            zone alias3
        ZONE ALIAS1:
            port1 on HBA1 on Host1
            node1 on HBA1 on Host1
            Port0 on Array0
        ZONE ALIAS2:
            port1 on HBA1 on Host1
            port0 on Array0
        ZONE ALIAS3:
            port1 on Array0

FIGS. 2A and 2B illustrate exemplary zone membership and zone alias membership tables, respectively, for port1 of HBA1 on Host1. FIGS. 3A and 3B illustrate exemplary zone membership and zone alias membership tables, respectively, for Host1. FIGS. 4A and 4B illustrate exemplary zone membership and zone alias membership tables, respectively, for HBA1 on Host1. FIGS. 5A and 5B illustrate exemplary zone membership and zone alias membership tables, respectively, for LUN0 on Array0. FIGS. 6A and 6B: illustrate exemplary zone membership and zone alias membership tables, respectively, for Array0.

From each of the exemplary tables illustrated in FIGS. 2A through 6B, the zones in the cells of the first column of the zone membership tables or the zone aliases in the cells of the first column of the zone alias membership tables may be user-selectable links to navigate to and view graphical topological and/or textual zone-centric views of the zone or zone alias represented in the cell. From each of the exemplary tables illustrated in FIGS. 2A through 6B, the SAN objects represented in the cells of the "Zoned By" column of the zone membership tables and the SAN objects represented in the cells of the "Zoned By" column of the zone alias membership tables may be user-selectable links to navigate to and view a SAN object-centric zoning view for the selected SAN object. In a zone membership table, if the "Zoned By" column indicates that the current SAN object being viewed is a member in a particular zone by way of a zone alias, the zone alias in the cell may be a user-selectable link to navigate to and view a graphical topological and/or textual zone-centric views of the zone alias represented in the cell.

In one embodiment, the fabric represented in the cells of the "Fabric" column of the zone membership tables and zone alias membership tables may be user-selectable to view graphical and/or textual views of the fabrics represented in the cells. The fabric view for a fabric may display, for example, all of the zones and zone aliases, if any, currently on the fabric. The displayed zones and zone aliases for a fabric may be user-selectable links to graphical and/or textual zone-centric views of the zones and/or zone aliases.

Figure 7:
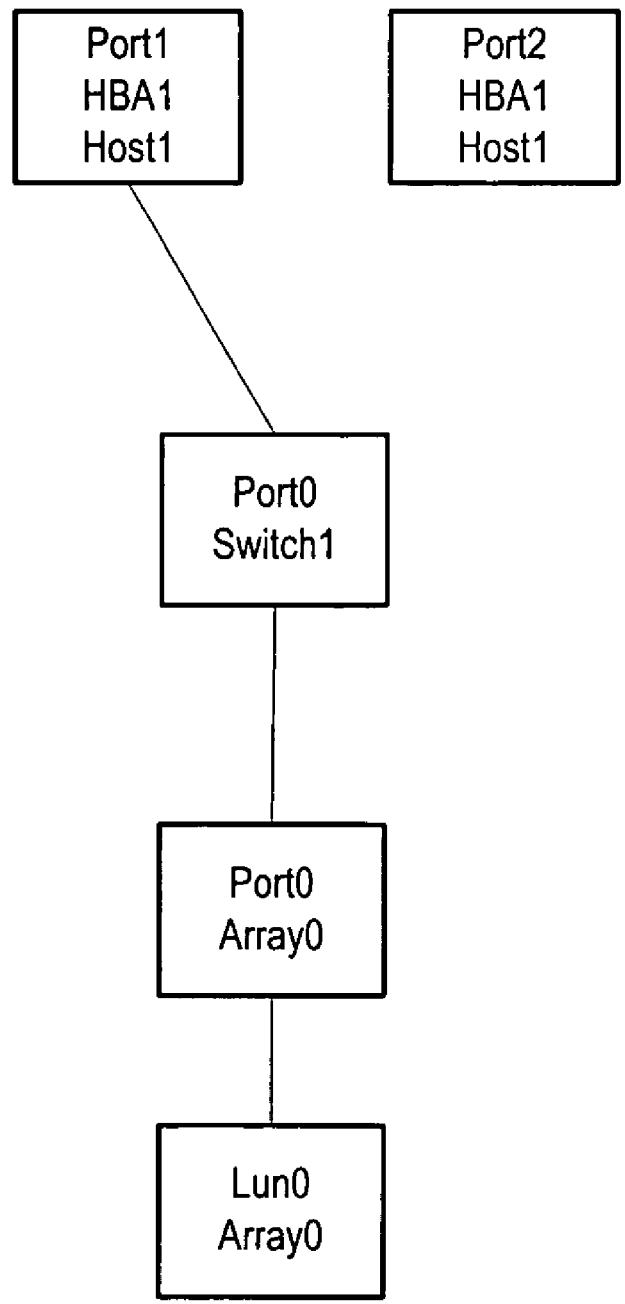
FIG. 7 illustrates an exemplary topological logical zoning view of a simple fabric zone according to one embodiment.

FIG. 7 illustrates an exemplary topological zoning view of a simple fabric zone according to one embodiment. The zoning view may be selected and viewed from SAN object-centric zoning views presented by the zoning visualization mechanism to view a zone including the SAN objects logically and/or physically in the zone and relationships among the objects. This exemplary zoning view shows a zone with Port1 of HBA1 on Host1 coupled to Port0 of Switch1, which is in turn coupled to Port0 of Array0. Lun0 of Array0 may be a logical member of the zone by virtue of being bound to Port0, which may be a physical member of the zone. SAN objects in the zone that are not connected to other SAN objects, such as Port2 of HBA1 on Host1, may also be displayed. In addition to the low-level objects shown in FIG. 7, one or more high-level SAN objects (e.g. HBA1 and/or Host1) that are logical members of the zone may also be displayed on the topological zoning view. In one embodiment, SAN objects that are logical members of the zone by virtue of membership in a zone alias may also be displayed. SAN objects displayed in the topological zoning view may be user-selectable to display SAN object-centric zoning views for the selected SAN objects. Note that a topological zoning view of a zone alias may be similarly displayed. Also note that this example is not intended to be limiting and that other methods of graphically displaying topological zone and zone alias information may be used.

Figure 8:
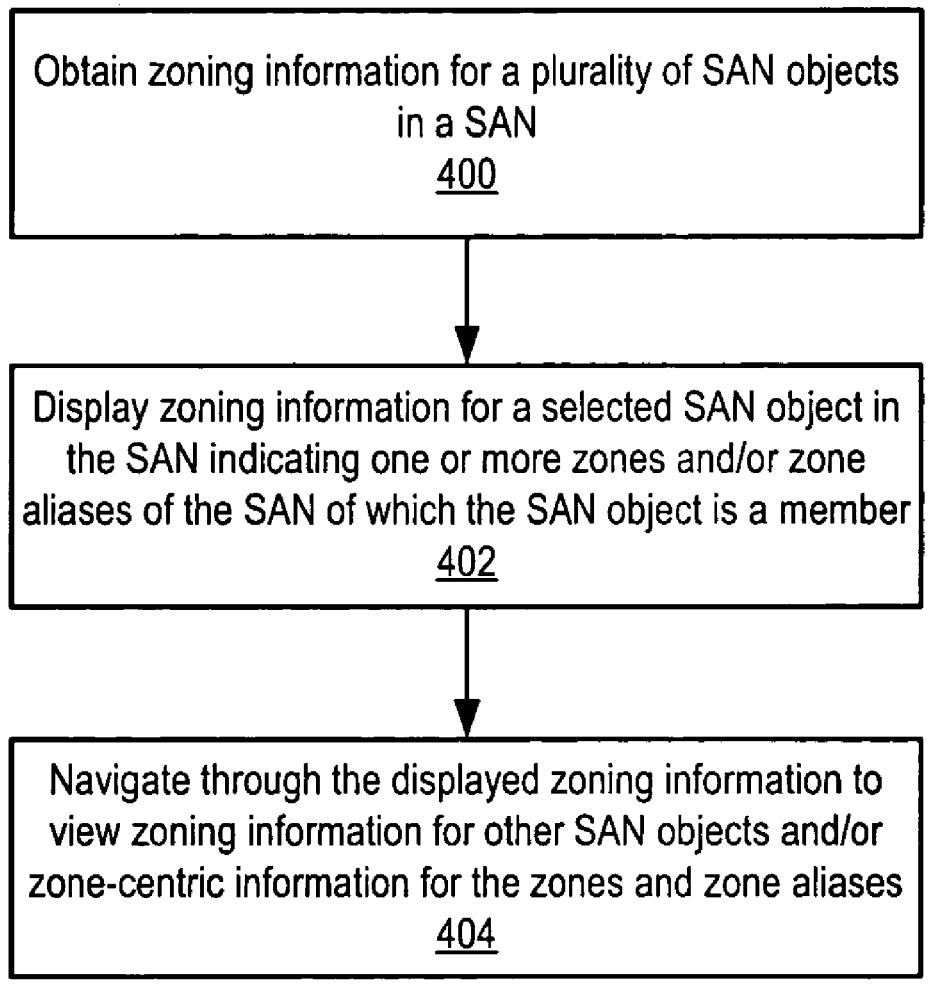
FIG. 8 is a flowchart a method for displaying SAN object-centric logical and/or physical zoning information for objects in a SAN according to one embodiment.

FIG. 8 is a flowchart a method for displaying SAN object-centric zoning information for objects in a SAN according to one embodiment. As indicated at 400, a zone visualization mechanism may obtain SAN zoning information for a plurality of SAN objects in a SAN including one or more host systems, one or more storage devices, and one or more fabrics. In one embodiment, the zone visualization mechanism may collect SAN information, including SAN object, zoning and other information, from one or more sources. In one embodiment, the zone visualization mechanism may discover various cross-vendor, heterogeneous objects on the SAN, and collect at least a part of the SAN information from the SAN objects. In other embodiments, the zone visualization mechanism may collect at least a part of the SAN information from other sources, for example from a SAN management system such as the exemplary SAN management system described below.

As indicated at 402, the zone visualization mechanism may display zoning information for a selected SAN object in the SAN. In one embodiment, the displayed zoning information may indicate one or more zones of the SAN of which the selected SAN object is a member. In one embodiment, the displayed zoning information may indicate one or more zone aliases of the SAN of which the selected SAN object is a member. In one embodiment, the displayed zoning information for each zone of which the selected SAN object is a member may indicate another SAN object through which the selected SAN object is connected to the zone. In one embodiment, the zoning information for the selected SAN object in the SAN may be displayed in graphical format or textual format according to user preference.

As indicated at 404, a user may navigate through the displayed zoning information to view zoning information for other SAN objects and/or zone-centric information for the zones and zone aliases. In one embodiment, the other SAN object through which the selected SAN object is connected to the zone may be user-selectable to display zoning information for the other SAN object indicating one or more zones, and zone aliases if any, of the SAN of which the other SAN object is a member.

In one embodiment, the indicated one or more zones and/or zone aliases of the SAN of which the selected SAN object is a member may be user-selectable to display zone-centric information for the selected zone or zone alias. The zone-centric information for a zone or zone alias may indicate one or more SAN objects that are members of the zone or zone alias and relationships among the one or more SAN objects that are members of the zone or zone alias. The one or more other SAN objects that are members of the zone may be user-selectable to display SAN object-centric zoning information for the SAN objects indicating the one or more zones of the SAN of which the selected SAN object is a member. In one embodiment, the zone-centric information for a selected zone or zone alias may be displayed in graphical format or textual format according to user preference.

FIG. 9 illustrates an exemplary SAN implementing an embodiment of a zone visualization mechanism for object-centric SAN visualization according to one embodiment. For one embodiment, a SAN may be described as a high-speed, special-purpose network that interconnects storage devices 110 (e.g. storage devices 110A, 110B, and 110C) with associated data servers (e.g. hosts 120A, 120B, and 120C) on behalf of a larger network of users. A SAN may employ Fibre Channel technology. A SAN may include one or more hosts 120 (e.g. hosts 120A, 120B, and 120C), one or more storage devices 110 (e.g. storage devices 110A, 110B, and 110C), and one or more SAN fabrics 100. One or more end-user platforms may access the SAN, typically via a LAN or WAN connection to one or more of the hosts 120. In this exemplary SAN, an administrative system 150 and a client system 154 may access the SAN through hosts 120 via network 140.

Storage devices 110 may include one or more of, but are not limited to, RAID (Redundant Array of Independent Disks) systems, disk arrays, JBODs (Just a Bunch Of Disks, used to refer to disks that are not configured according to RAID), tape devices, and optical storage devices. Hosts 120 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 120 is typically connected to the SAN fabric 100 via one or more Host Bus Adapters (HBAs). SAN fabric 100 may enable server-to-storage device connectivity through Fibre Channel switching technology. SAN fabric 100 hardware may include one or more fabric components (e.g. switches 102, bridges 104, hubs 106, or other devices 108 such as routers), as well as the interconnecting cables (for Fibre Channel SANs, fibre optic cables).

Hosts 120 may include one or more SAN applications such as SAN management server 122 on host 120A and SAN application 124 on host 120C. End-user platforms may include software for accessing and/or administering the SAN via hosts 120. In this example, administrative system 150 includes SAN management software 152 and client system 154 includes client application 156. In one embodiment, SAN management server 122 and SAN management software 152 may be components of a SAN management system such as the exemplary SAN management system described below.

In one embodiment, zone visualization mechanism 130 may be a stand-alone application. One or more hosts 120 may each include an instance of zone visualization mechanism 130; in this example, host 120B includes an instance of zone visualization mechanism 130. In one embodiment, instances of zone visualization mechanism 130 may reside on end-user platforms such as administrative system 150 and/or client system 154. In another embodiment, zone visualization mechanism 130 may be a component of an application on a host 120 or on an end-user platform. In one embodiment, zone visualization mechanism 130 may be a component of SAN management server 122. In one embodiment, zone visualization mechanism 130 may be a component of SAN management software 152. In one embodiment, zone visualization mechanism 130 may be a component of a SAN application on a host such as SAN application 124. In one embodiment, zone visualization mechanism 130 may be a component of a client application on a client system such as client application 156.

In one embodiment, a user or administrator may access an instance of zone visualization mechanism 130 on a host 120 such as host 120B or on an end-user platforms such as administrative system 150 or client system 154 to view graphical and/or textual displays and/or generate reports of logical zone and zone alias information for heterogeneous SAN objects in the SAN.

In one embodiment, zone visualization mechanism 130 may access the SAN and SAN objects to collect SAN information including SAN object, zoning and other information for the SAN objects. In this embodiment, zone visualization mechanism 130 may discover cross-vendor, heterogeneous objects on the SAN, and collect the SAN information from the discovered objects. In another embodiment, zone visualization mechanism 130 may obtain zoning and other information for heterogeneous SAN objects from one or more other SAN applications, for example SAN management server 122 and/or SAN application 124. In yet another embodiment, zone visualization mechanism 130 may directly access the SAN and SAN objects to obtain a part of the zoning and other information, and may obtain the rest of the zoning and other information from one or more other SAN applications. In one embodiment, at least a part of the SAN information may be manually entered by a user or administrator, and/or may be accessed from a database of SAN information.

In one embodiment, collection of at least some of the SAN information may be performed using in-band and/or out-of-band collection mechanisms. In-band refers to transmission of a protocol other than the primary data protocol over the same medium (e.g. Fibre Channel) as the primary data protocol. Out-of-band refers to transmission of management information for Fibre Channel components outside of the Fibre Channel network, typically over Ethernet, and for example using the SNMP protocol. In one embodiment, these collection mechanisms may include in-band mechanisms that may employ logical or physical connectivity to collect information from the various SAN objects of the SAN. In one embodiment, these collection mechanisms may include out-of-band mechanisms that are independent of the connectivity of the in-band path including one or more of, but not limited to, SNMP, telnet sessions to hardware telnet interfaces and connections to web base hardware interfaces. One embodiment may collect the SAN information using one or more in-band and/or out-of-band protocols and industry standards (e.g. MS/CT, GS-3, SNMP, Fibre Alliance MIB, ANSI T11, SCSI, CIM (Common Information Model), vendor-specific extensions, etc.). Using either or both in-band and out-of-band protocols, and leveraging industry standards, the zone visualization mechanism 130 may obtain information including one or more of, but not limited to, device driver version, firmware level, status, performance, free and in-use port count, hardware manufacturer, model number and worldwide name (WWN) for SAN objects.

One embodiment of a system and method for object-centric SAN zoning visualization may be implemented in a SAN management system such as the exemplary SAN management system described below. In one embodiment, a zone visualization mechanism 130 may be implemented in a SAN management server such as the SAN management server of the exemplary SAN management system described below. In one embodiment, a SAN management system such as the exemplary SAN management system described below may discover information for SAN objects including, but not limited to, hosts, storage devices, and fabric devices (e.g. switches), and/or may generate zoning information during zoning operations using the SAN management system, and the discovered and/or generated information may be accessed by zone visualization mechanism 130 and used in displaying and reporting object-centric zone information for the SAN. In one embodiment, SAN object information and/or zoning information may be stored in and accessed from a database of a SAN management system, for example, a SAN access layer data store of the exemplary SAN management system described below.

A SAN management system such as the exemplary SAN management system described below may include a SAN access layer and may provide an interface to functionality of the SAN access layer to external applications and/or internal components of the SAN management system. In embodiments where zone visualization mechanism 130 is external to the SAN management system, a SAN access layer API may expose at least a portion of the functionality of the SAN access layer to zone visualization mechanism 130, and zone visualization mechanism 130 may obtain at least a part of the zoning and other information via the SAN access layer API. In embodiments where zone visualization mechanism 130 is a component of the SAN management system, zone visualization mechanism 130 may leverage the SAN access layer API to access the SAN access layer and obtain at least a part of the zoning and other information.

Figure 10:
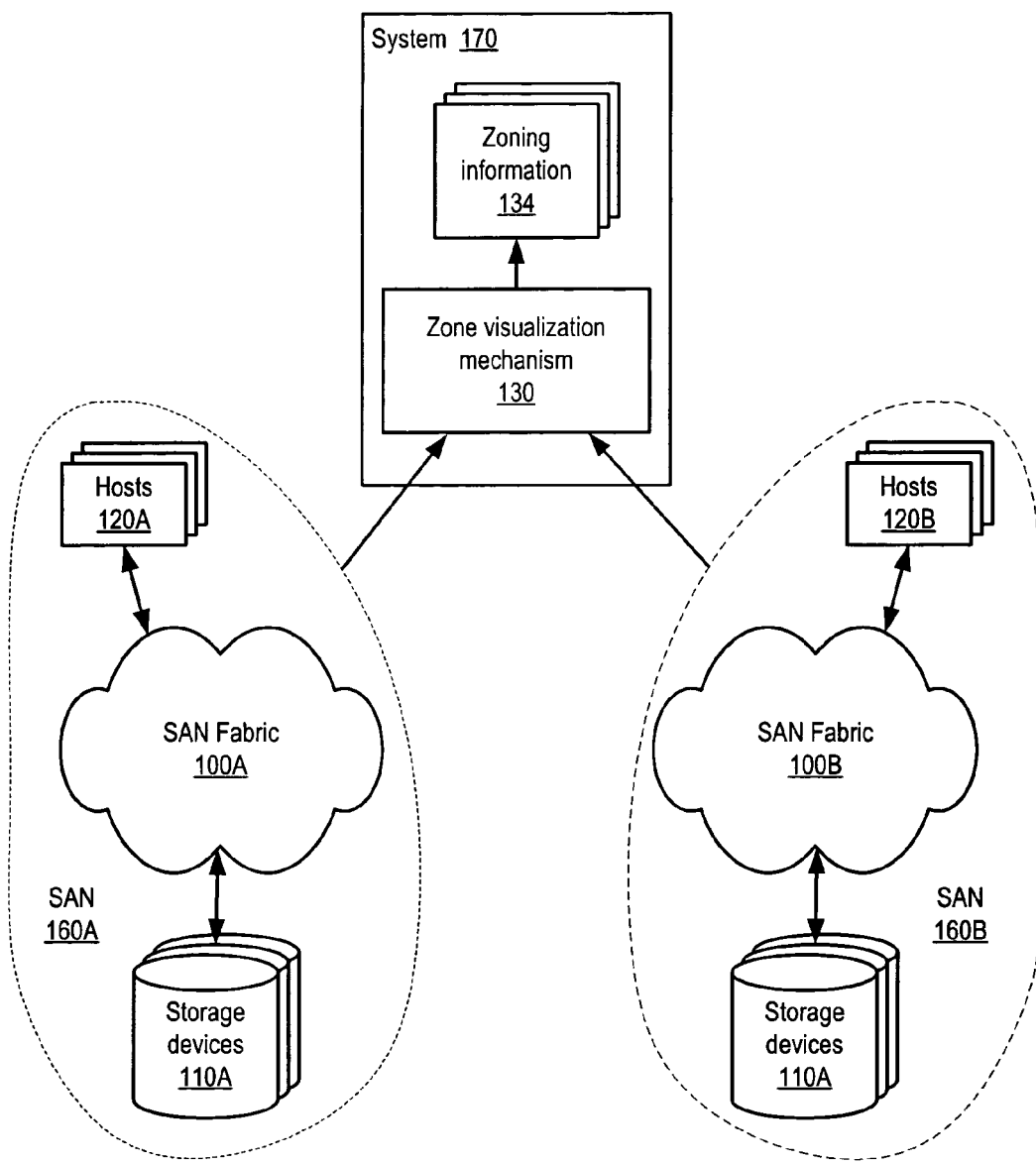
FIG. 10 illustrates a system implementing a zone visualization mechanism for object-centric SAN visualization of two or more SANs according to one embodiment.

In one embodiment, a zone visualization mechanism may reside on a system coupled to two or more SANs and may be used for object-centric SAN visualization of the two or more SANs. FIG. 10 illustrates a system implementing a zone visualization mechanism for object-centric SAN visualization of two or more SANs according to one embodiment. In this example, system 170 is configured to couple to two or more SANs 160, including SAN 160A and 160B. Zone visualization mechanism 130 on system 170 may access both SANs to obtain SAN information and display zone- and/or object-centric zoning information 134 for the SANs 160. System 170 may be a host 120 system in one or more of the SANs 160, or may be a system external to the SANs 160.

Fabric Zoning

This section describes various SAN objects that may be zoned and zoning operations through which the SAN objects may be added to zones. All of the SAN objects described in this section may be viewed in SAN-object centric zoning views and zone-centric views using embodiments of the zone visualization mechanism described above.

LUN (Logical Unit Number) security is a collective name given to the operations involved in making storage device resources available to hosts on a SAN. LUN security operations may include LUN binding, LUN masking, and fabric zoning. A LUN is the SCSI (Small Computer System Interface) identifier of a logical unit within a SCSI target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller corresponds to a virtual disk.

Figure 11:
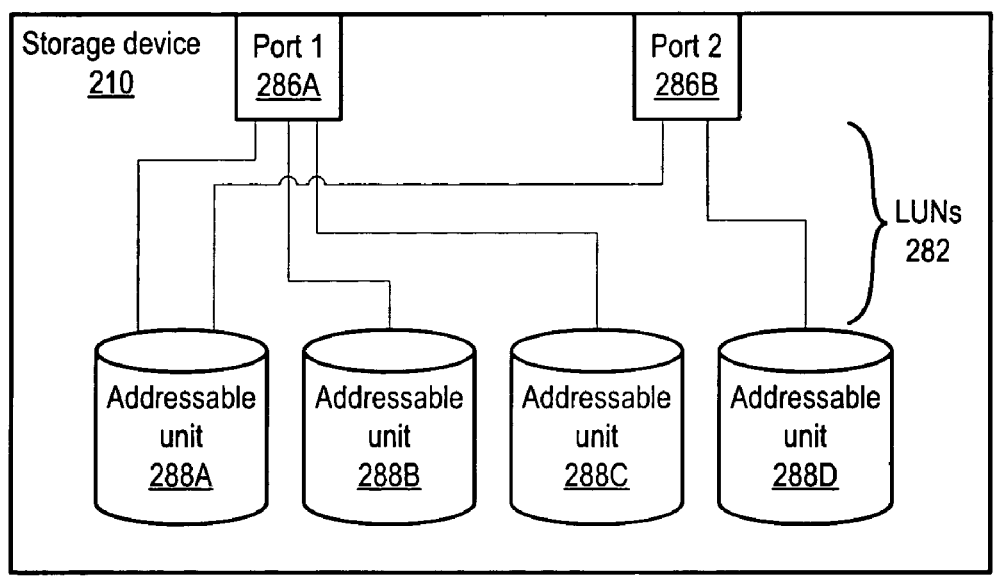
FIG. 11 illustrates LUN binding according to one embodiment.

FIG. 11 illustrates LUN binding according to one embodiment. LUN binding may be defined as the creation of access paths between an addressable unit (which may also be referred to as an AddrUnit, an AU, a unit, a volume, a logical unit, a logical disk, or a logical device) within a disk array and a port on the array. In the LUN binding process, an AU 288 is bound to a specified array port 286 (e.g. array port 286A or 286B) in a specified storage device 210 (e.g. a storage system/disk array)). This results in the creation of a LUN 282. AUs 288A, 288B, 288C, and 288D are storage volumes built out of one or more physical discs within the storage device 104. Array ports 286A and 286B are connected to the SAN fabric 100 and function as SCSI targets behind which the AUs 288 bound to those ports 286 are visible. "LUN" is the term for the access path itself between an AU 288 and an array port 286, so LUN binding is actually the process of creating LUNs 282. However, a LUN 282 is also frequently identified with the AU 288 behind it and treated as though it had the properties of that AU 288. For the sake of convenience, a LUN 282 may be thought of as being the equivalent of the AU 288 it represents. Note, however, that two different LUNs 282 may represent two different paths to a single volume. A LUN 282 may be bound to one or more array ports 286. A LUN 282 may be bound to multiple array ports 286, for example, for failover, switching from one array port 286 to another array port 286 if a problem occurs.

Figure 12:
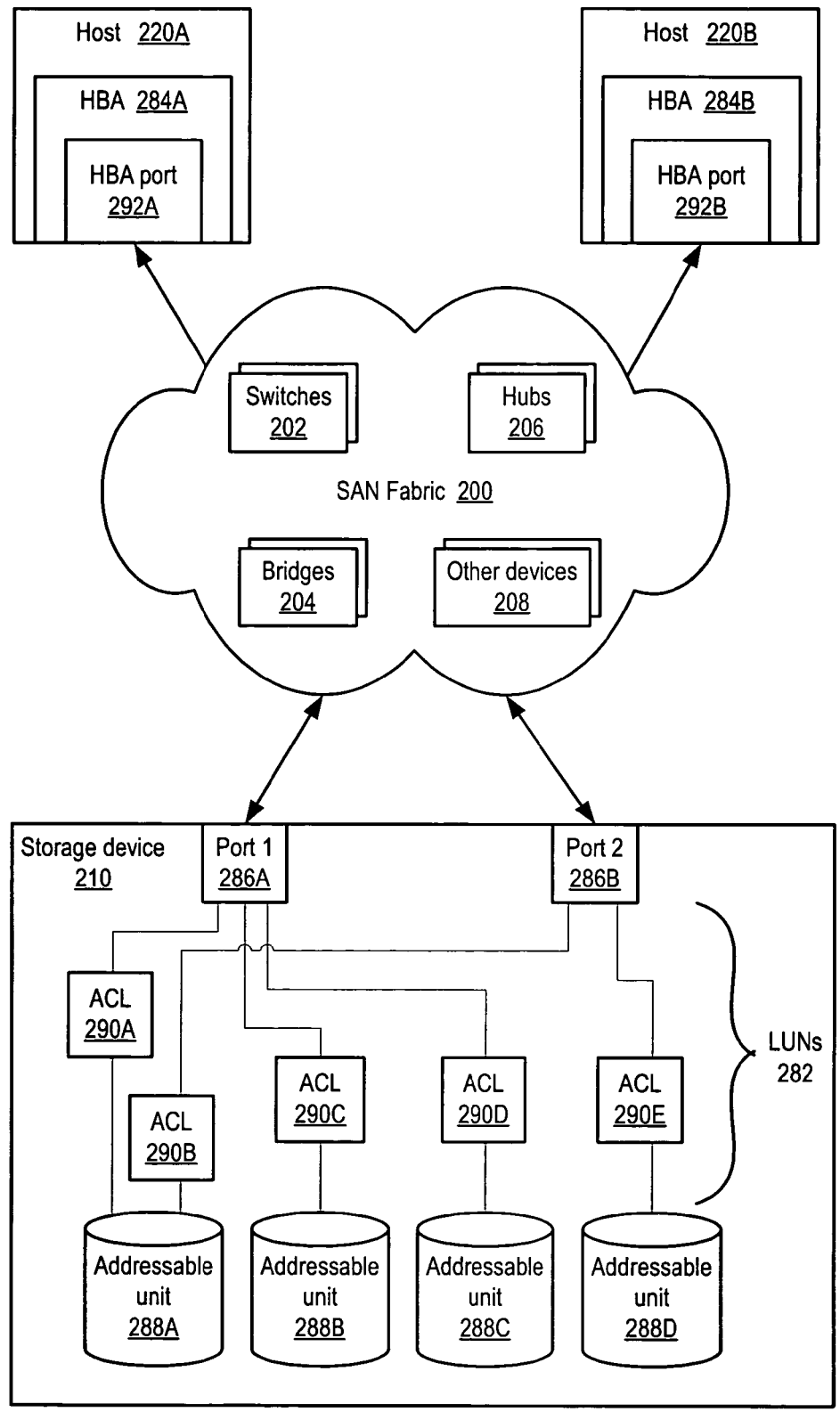
FIG. 12 illustrates LUN masking according to one embodiment.

FIG. 12 illustrates LUN masking according to one embodiment. LUN masking enables access to a particular Addressable Unit for a host on the SAN. LUN masking is a security operation that indicates that a particular host 220 (e.g. host 220A or 220B), HBA (Host Bus Adapter) 284 (e.g. HBA 284A or 284B), or HBA port 292 (e.g. HBA port 292A or 292B) is able to communicate with a particular LUN 282. In the LUN masking process, a bound AU 288 (e.g. AU 288A, 288B, 288C or 288D) may be masked to a specified HBA port 292, HBA 284, or host 220 (e.g. all HBAs on the host) through a specified array port 286 in a specified storage device 210. When an array LUN 282 is masked, an entry is added to the Access Control List (ACL) 290 (e.g. ACL 290A, 290B, 290C, 290D, or 290E) for that LUN 282. Each ACL 290 includes the World Wide Name of each HBA port 292 that has permission to use that access path—that is, to access that AU 288 through the particular array port 286 represented by the LUN 282.

LUN masking may be thought of as the removal of a mask between an AU 288 and a host 220 to allow the host to communicate with the LUN 282. The default behavior of the storage device 210 may be to prohibit all access to LUNs 282 unless a host 220 has explicit permission to view the LUNs 282. The default behavior may depend on the array model and, in some cases, the software used to create the AU 288.

Figure 13:
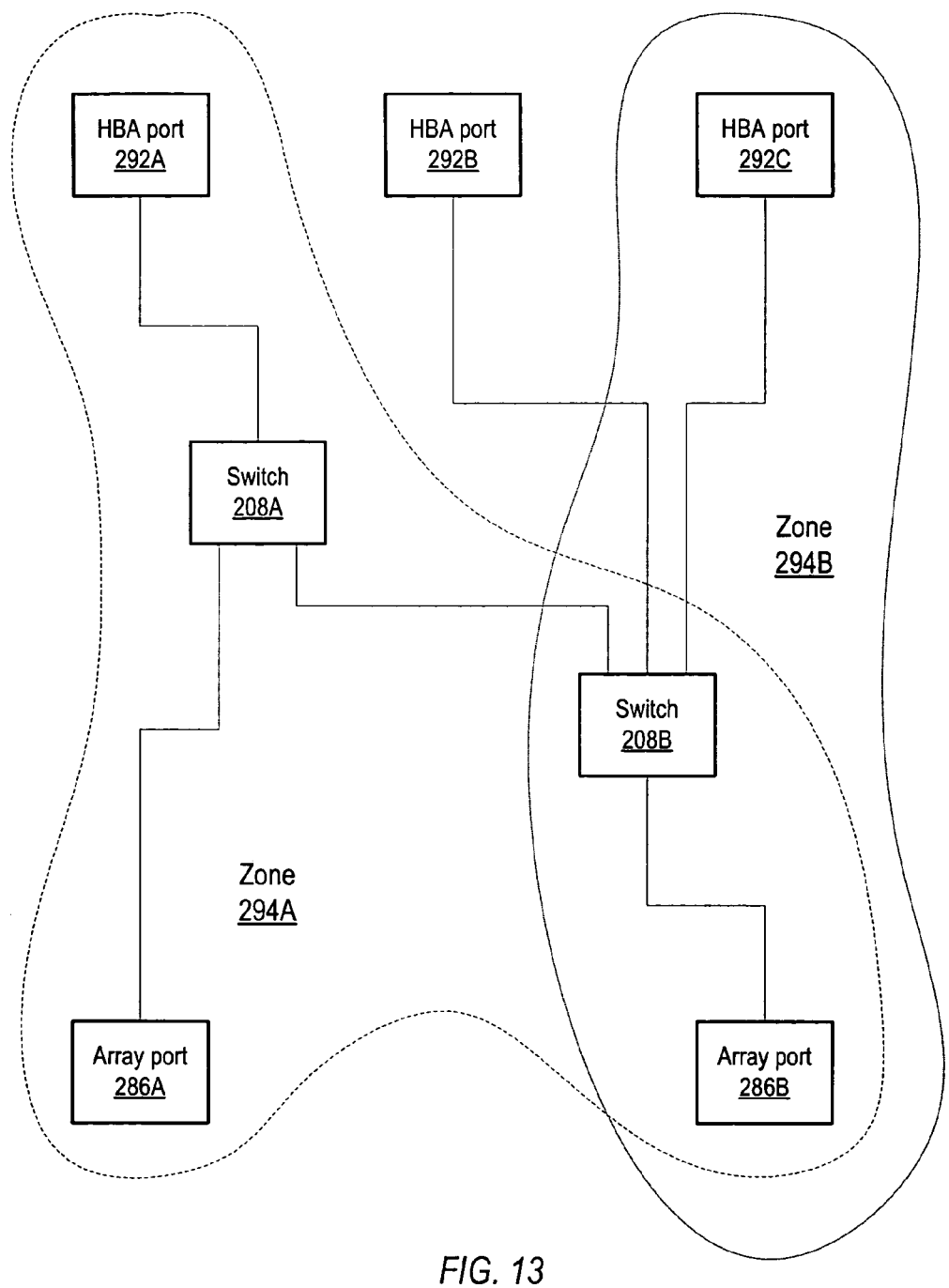
FIG. 13 illustrates fabric zoning according to one embodiment.

FIG. 13 illustrates fabric zoning according to one embodiment. After a LUN is masked to an HBA port 292 (e.g. HBA port 292A, 292B or 292C) in a host, the zoning configuration of the SAN fabric may still prevent the host from accessing the AU behind that LUN. In order for the host to see the AU and create an Operating System (OS) handle for it, there must be at least one zone on the fabric that contains both the HBA port 292 (e.g. HBA port 292A, 292B or 292C) and the array port 286 (e.g. array port 286A or 286B) to which the AU is bound. A zoning operation may be required if the HBA port 292 and array port 286 are not already zoned together. Zoning operations may include creating a new zone 294 and adding the array port 286 and the HBA port 292 to an existing zone 294. Zones 294 may also include one or more ports on one or more fabric devices (e.g. switches 208A and 208B) in the device path between the array port 286 and the HBA port 292. Fabric zoning occurs at the level of individual nodes or ports (low-level SAN objects) attached to the SAN fabric. Zones and their member objects may be defined in zoning tables within the switches 208 on the SAN fabric. When zoning is implemented on a SAN fabric, the switches 208 consult the zoning table to determine whether one object is permitted to communicate with another object, and restrict access between them unless they share a common membership in at least one zone.

In FIG. 13, zone 294A includes HBA port 292A, the array ports 286A and 286B through which HBA port 292A may access LUNs bound to the array ports 286, and the switch ports on switches 108A and 108B through which HBA port 292A and array ports 286 are coupled. Zone 294B includes HBA port 292C, array port 286B through which HBA port 292C may access LUNs bound to the array port 286B, and the switch port(s) on switch 208B through which HBA port 292C and array port 286B are coupled. HBA ports 292A, 292B and 292C may be on the same host or on different hosts and, if on the same host, on the same HBA or on different HBAs. Array ports 286A and 286B may be on the same storage system or on different storage systems.

Figure 14:
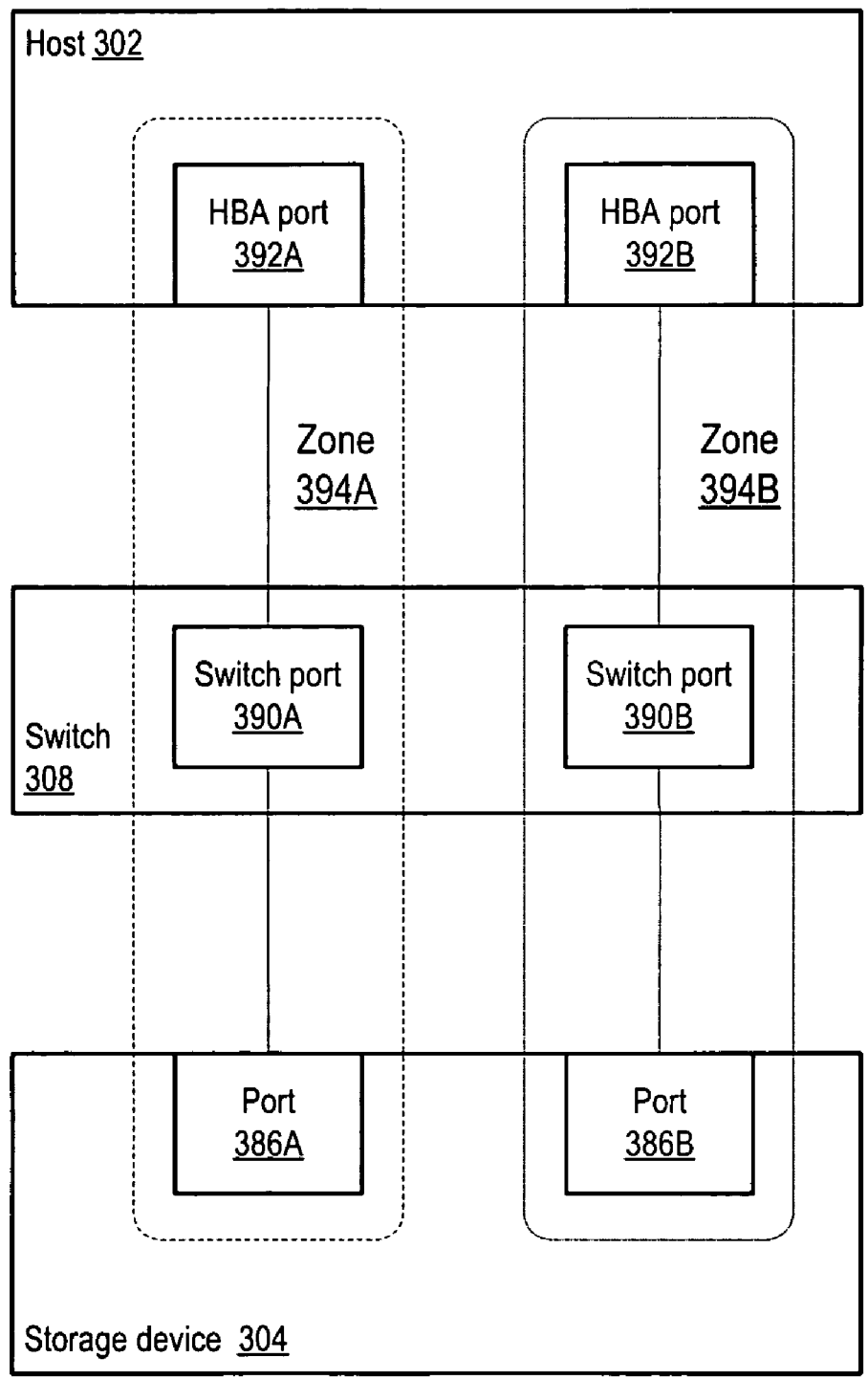
FIG. 14 illustrates an exemplary SAN with zones defining paths in a SAN according to one embodiment.

Paths between an application and its storage may be defined by zones in the SAN fabric. FIG. 14 illustrates an exemplary SAN with zones defining paths in a SAN according to one embodiment. A fabric may include more than one zone 394, and two or more zones may provide alternative paths between an application and its storage. In FIG. 14, two zones 394A and 394B are shown as alternative paths between application 320 on host 302 and the application's storage on storage device 304. In this example, zone 394A includes HBA port 392A on host 302, switch port 390A on switch 308, and port 386A on storage device 304. Zone 394B includes HBA port 392B on host 302, switch port 390B on switch 308, and port 386B on storage device 304. Note that zones may include more than one of HBA ports 392, switch ports 390, and storage device ports 386. Also note that SAN objects including, but not limited to, HBA ports 392, switch ports 390, and storage device ports 386 may be included in more than one zone on a SAN.

Exemplary SAN Management System

Embodiments of an exemplary centralized Storage Area Network (SAN) management system are described in which embodiments of a zone visualization mechanism for displaying and navigating through SAN object-centric zoning information for a SAN, as described above, may be implemented and/or from which embodiments of a zone visualization mechanism may obtain at least a portion of the required SAN information.

Figure 15:
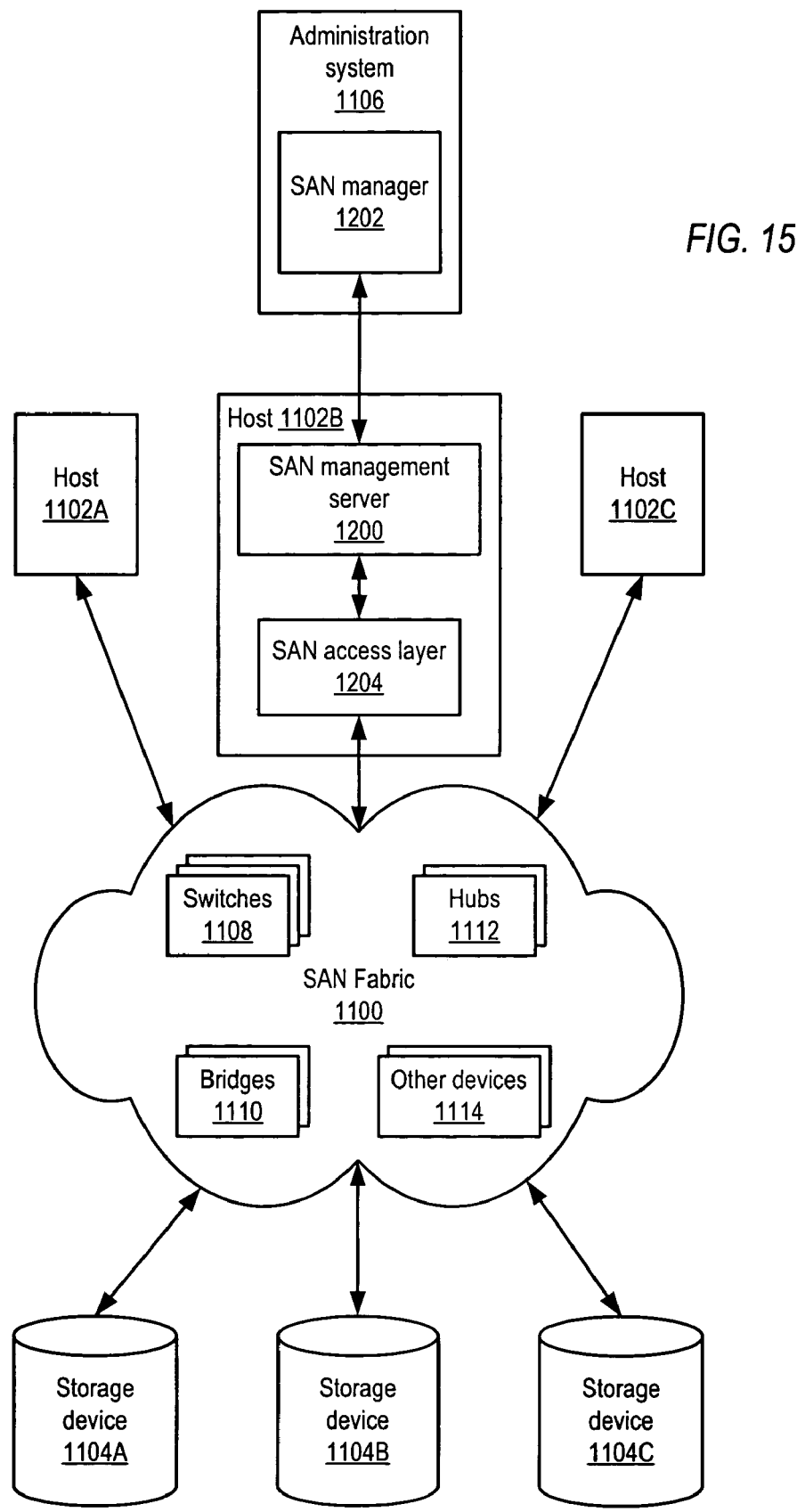
FIG. 15 shows an exemplary SAN implementing an embodiment of the SAN management system.

FIG. 15 shows an exemplary SAN implementing an embodiment of the SAN management system. The SAN may include one or more hosts 1102 (e.g. hosts 1102A, 1102B, and 1102C), one or more storage devices 1104 (e.g. storage devices 1104A, 1104B, and 1104C), and one or more SAN fabrics 1100. A SAN may also include one or more administration systems 1106. One or more end-user platforms (not shown) may access the SAN, typically via a LAN or WAN connection to one or more of the hosts 1102.

Embodiments may simplify and centralize the management of heterogeneous SANs to enable control of SAN resources including, but not limited to, logical volumes, fibre channel adapters, and switches 1108, as well as storage devices 1104. Embodiments may provide centralized management of SAN-connected devices with automatic discovery, visualization, access control, and policy-based monitoring, alerting and reporting. Embodiments may provide a single point of management from logical unit to interconnect to SAN-connected hosts 1102. Embodiments may provide data-centric management from host applications through interconnects to the storage resources, regardless of the underlying hardware and operating system(s). SAN management may occur at physical and logical levels to maintain control regardless of the underlying device environment.

One embodiment may be based on distributed client-server architecture, and may be divided into components that may include one or more SAN managers 1202, a SAN management server 1200, and a SAN access layer 1204. In one embodiment, the SAN access layer may be a component of the SAN management server 1200.

SAN management server 1200 may discover SAN objects and their attributes, and may provide event management, policy management, and/or notification services. SAN management server 1200 may explore the SAN to make data available to client applications, including SAN manager 1202. One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system.

Embodiments may reduce or eliminate the manual task of tracking of devices and their connections in the SAN by automatically discovering the physical and logical connections of the SAN, displaying the information in a graphical topology map and logging the data in a variety of inventory reports. One embodiment may enable the automatic discovery of SAN resources using one or more in-band and/or out-of-band protocols and industry standards.

By discovering objects and the relationship of these objects to each other, SAN access layer 1204 may maintain a real-time topology of the SAN. SAN access layer 1204 may also directly interface with switches on one or more fabrics to manage the zoning of storage resources. SAN access layer 1204 may discover additional information about objects on the SAN that SAN management server 1200 cannot discover directly, such as devices on a separate zone or fabric 1100. In one embodiment, SAN access layer 1204 may include one or more explorers that provide an interface to different types of heterogeneous SAN components so that the SAN management system may provide a common data representation for heterogeneous SAN components. Explorers may communicate with the SAN components over Fibre Channel (in-band) and/or Ethernet (out-of-band) connections to inventory the SAN. Each explorer may communicate with a specific type of device using a protocol available for that specific type of device. Explorers may include one or more of, but are not limited to, in-band and/or out-of-band switch explorers, zoning explorers, disk array explorers, and Host Bus Adapter (HBA) explorers.

Once the SAN is discovered, SAN access layer 1204 may continue to monitor the SAN and may update a data store as new events occur on the SAN. In one embodiment, SAN access layer 1204 may periodically examine the SAN, for example to discover or determine objects that are added, objects that are removed, and connections that are pulled. In one embodiment, data gathered by the explorers may be aggregated into a data store, which may be updated with real-time information about objects on the SAN.

SAN manager 1202 may provide a central management interface for various SAN management tasks, and may provide a graphical user interface for displaying the information (e.g. XML data) compiled by and received from SAN management server 1200 in graphical and/or textual format, and may provide a user interface for accessing various features of the SAN management system such as tools and utilities. SAN manager 1202 may run on any of a variety of end-user platforms coupled to one or more of the hosts 1102, typically via a LAN or WAN, or alternatively may run on one of the hosts 1102, including the host 1102 that includes SAN management server 1200.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory comprising program instructions, wherein the program instructions are executable by the processor to implement a zone visualization mechanism configured to:
   obtain zoning information for a plurality of Storage Area Network (SAN) objects in a SAN, wherein the SAN comprises one or more host systems, one or more storage devices, and one or more fabrics; and
   in response to selection of a particular SAN object in the SAN, display zoning information for the selected SAN object, wherein the zoning information for the selected SAN object includes information for each one of multiple zones of the SAN of which the selected SAN object is a member, wherein the information for each zone includes information describing a particular membership of the selected SAN object in the respective zone;
   wherein the zoning information further includes information for each one of one or more zone aliases of the SAN of which the selected SAN object is a logical or physical member, wherein the information for each zone alias includes information describing a particular membership of the selected SAN object in the respective zone alias, wherein a zone alias represents a logical grouping of SAN objects, and wherein a SAN object is a logical member of a zone alias via relationship of the SAN object to one or more other SAN objects that are physical members of the zone alias.

2. The system as recited in claim 1, wherein the zoning information indicates logical zone membership for the selected SAN object, wherein a SAN object is a logical member of a zone via relationship of the SAN object to one or more other SAN objects that are physical members of the zone.

3. The system as recited in claim 1, wherein, for each zone of the SAN of which the selected SAN object is a member, the zoning information includes information corresponding to each other SAN object through which the selected SAN object is a logical or physical member of the zone, wherein a SAN object is a logical member of a zone via relationship of the SAN object to other SAN objects that are physical members of the zone.

4. The system as recited in claim 3, wherein the information corresponding to another SAN object through which the selected SAN object is a logical or physical member of the zone is user-selectable to display zoning information for the respective other SAN object, wherein the zoning information for the other SAN object indicates one or more zones of the SAN of which the other SAN object is a logical or physical member.

5. The system as recited in claim 1, wherein the information corresponding to a zone in the SAN is user-selectable to display zone-centric information for the respective zone, wherein the zone-centric information indicates one or more SAN objects that are members of the zone and relationships among the one or more SAN objects that are members of the zone.

6. The system as recited in claim 5, wherein the indicated one or more SAN objects that are members of the respective zone are each user-selectable to display zoning information for the respective SAN object, wherein the zoning information for the respective SAN object indicates one or more zones of the SAN of which the respective SAN object is a member.

7. The system as recited in claim 5, wherein the zone visualization mechanism is further configured to display the zone-centric information for the respective zone in graphical format or textual format.

8. The system as recited in claim 1, wherein the zone visualization mechanism is configured to display the zoning information for the selected SAN object in graphical format or textual format.

9. A storage area network (SAN), comprising:
one or more host systems;
one or more storage devices;
a SAN fabric for coupling the host systems to the storage devices;
a system configured to implement a zone visualization mechanism, wherein the zone visualization mechanism is configured to:
obtain zoning information for a plurality of SAN objects in the SAN; and
in response to selection of a particular SAN object in the SAN, display zoning information for the selected SAN object, wherein the zoning information for the selected SAN object includes information for each one of multiple zones of the SAN of which the selected SAN object is a member, wherein the information for each zone includes information describing a particular membership of the selected SAN object in the respective zone
wherein the zoning information further includes information for each one of one or more zone aliases of the SAN of which the selected SAN object is a logical or physical member, wherein the information for each zone alias includes information describing a particular membership of the selected SAN object in the respective zone alias, wherein a zone alias represents a logical grouping of SAN objects, and wherein a SAN object is a logical member of a zone alias via relationship of the SAN object to one or more other SAN objects that are physical members of the zone alias.

10. The SAN as recited in claim 9, wherein the zoning information indicates logical zone membership for the selected SAN object, wherein a SAN object is a logical member of a zone via relationship of the SAN object to one or more other SAN objects that are physical members of the zone.

11. The SAN as recited in claim 9, wherein, for each zone of the SAN of which the selected SAN object is a member, the zoning information includes information corresponding to each other SAN object through which the selected SAN object is a logical or physical member of the zone, wherein a SAN object is a logical member of a zone via relationship of the SAN object to other SAN objects that are physical members of the zone.

12. The SAN as recited in claim 11, wherein the information corresponding to another SAN object through which the selected SAN object is a logical or physical member of the zone is user-selectable to display zoning information for the respective other SAN object, wherein the zoning information for the other SAN object indicates one or more zones of the SAN of which the other SAN object is a logical or physical member.

13. The SAN as recited in claim 9, wherein the information corresponding to a zone in the SAN is user-selectable to display zone-centric information for the respective zone, wherein the zone-centric information indicates one or more SAN objects that are members of the zone and relationships among the one or more SAN objects that are members of the zone.

14. The SAN as recited in claim 13, wherein the indicated one or more SAN objects that are members of the respective zone are each user-selectable to display zoning information for the respective SAN object, wherein the zoning information for the respective SAN object indicates one or more zones of the SAN of which the respective SAN object is a member.

15. The SAN as recited in claim 13, wherein the zone visualization mechanism is further configured to display the zone-centric information for the respective zone in graphical format or textual format.

16. The SAN as recited in claim 9, wherein the zone visualization mechanism is further configured to display the zoning information for the selected SAN object in graphical format or textual format.

17. A system, comprising:
means for obtaining zoning information for a plurality of Storage Area Network (SAN) objects in a SAN, wherein the SAN comprises one or more host systems, one or more storage devices, and one or more fabrics;
means for displaying zoning information for a selected SAN object in the SAN in response to selection of the object, wherein the zoning information for the selected SAN object includes information for each one of multiple zones of the SAN of which the selected SAN object is a member, wherein the information for each zone includes information describing a particular membership of the selected SAN object in the respective zone; and
means for displaying zone alias information for each one of one or more zone aliases of the SAN of which the selected SAN object is a logical or physical member, wherein the information for each zone alias includes information describing a particular membership of the selected SAN object in the respective zone alias, wherein a zone alias represents a logical grouping of SAN objects, and wherein a SAN object is a logical member of a zone alias via relationship of the SAN object to one or more other SAN objects that are physical members of the zone alias.

18. The system as recited in claim 17, wherein the displayed zoning information indicates logical zone membership for the selected SAN object, wherein a SAN object is a logical member of a zone via relationship of the SAN object to one or more other SAN objects that are physical members of the zone.

19. The system as recited in claim 17, wherein, for each zone of the SAN of which the selected SAN object is a logical member, the zoning information includes information corresponding to each other SAN object through which the selected SAN object is connected to the zone, wherein a SAN object is a logical member of a zone via relationship of the SAN object to one or more other SAN objects that are physical members of the zone, and wherein the system further comprises means for displaying zoning information for the other SAN objects, wherein the zoning information for the other SAN objects indicates one or more zones of the SAN of which the other SAN objects are logical or physical members.

20. The system as recited in claim 17, further comprising means for displaying zone-centric information for the zones of the SAN of which the selected SAN object is a member, wherein the zone-centric information for a zone indicates one or more SAN objects that are members of the zone and relationships among the one or more SAN objects that are members of the zone.

21. A method, comprising:
obtaining zoning information for a plurality of Storage Area Network (SAN) objects in a SAN, wherein the SAN comprises one or more host systems, one or more storage devices, and one or more fabrics; and
displaying zoning information for a selected SAN object in the SAN in response to selection of the SAN object, wherein the zoning information for the selected SAN object includes information for each one of multiple zones of the SAN of which the selected SAN object is a member, wherein the information for each zone includes information describing a particular membership of the selected SAN object in the respective zone;
wherein the zoning information further includes information for each one of one or more zone aliases of the SAN of which the selected SAN object is a logical or physical member, wherein the information for each zone alias includes information describing a particular membership of the selected SAN object in the respective zone alias, wherein a zone alias represents a logical grouping of SAN objects, and wherein a SAN object is a logical member of a zone alias via relationship of the SAN object to one or more other SAN objects that are physical members of the zone alias.

22. The method as recited in claim 21, wherein the displayed zoning information indicates logical zone membership for the selected SAN object, wherein a SAN object is a logical member of a zone via relationship of the SAN object to one or more other SAN objects that are physical members of the zone.

23. The method as recited in claim 21, wherein, for each zone of the SAN of which the selected SAN object is a member, the zoning information includes information corresponding to each other SAN object through which the selected SAN object is a logical or physical member of the zone, wherein a SAN object is a logical member of a zone via relationship of the SAN object to other SAN objects that are physical members of the zone.

24. The method as recited in claim 23, further comprising:
accepting user input selecting information corresponding to a particular other SAN object through which the selected SAN object is a logical or physical member of the zone; and
displaying zoning information for the particular other SAN object in response to the user input, wherein the zoning information for the particular other SAN object indicates one or more zones of the SAN of which the particular other SAN object is a logical or physical member.

25. The method as recited in claim 21, further comprising:
accepting user input selecting one of the indicated one or more zones of the SAN of which the selected SAN object is a member; and
displaying zone-centric information for the selected zone in response to the user input, wherein the zone-centric information indicates one or more SAN objects that are members of the selected zone and relationships among the one or more SAN objects that are members of the selected zone.

26. The method as recited in claim 25, further comprising:
accepting user input selecting one of the one or more SAN objects that are members of the selected zone; and
displaying zoning information for the user-selected SAN object in response to the user input selecting the SAN object, wherein the zoning information for the user-selected SAN object indicates one or more zones of the SAN of which the user-selected SAN object is a member.

27. The method as recited in claim 25, further comprising displaying the zone-centric information for the zone corresponding to the selected entry in one of graphical format or textual format.

28. The method as recited in claim 21, further comprising displaying zoning information for the selected SAN object in graphical format or textual format.

29. A computer readable storage medium comprising program instructions, wherein the program instructions are computer-executable to implement:
obtaining zoning information for a plurality of Storage Area Network (SAN) objects in a SAN, wherein the SAN comprises one or more host systems, one or more storage devices, and one or more fabrics; and
displaying zoning information for a selected SAN object in the SAN in response to selection of the SAN object, wherein the zoning information for the selected SAN object includes information for each one of multiple zones of the SAN of which the selected SAN object is a member, wherein the information for each zone includes information describing a particular membership of the selected SAN object in the respective zone;
wherein the zoning information further includes information for each one of one or more zone aliases of the SAN of which the selected SAN object is a logical or physical member, wherein the information for each zone alias includes information describing a particular membership of the selected SAN object in the respective zone alias, wherein a zone alias represents a logical grouping of SAN objects, and wherein a SAN object is a logical member of a zone alias via relationship of the SAN object to one or more other SAN objects that are physical members of the zone alias.

30. The computer readable storage medium as recited in claim 29, wherein the displayed zoning information indicates logical zone membership for the selected SAN object, wherein a SAN object is a logical member of a zone via relationship of the SAN object to one or more other SAN objects that are physical members of the zone.

31. The computer readable storage medium as recited in claim 29, wherein, for each zone of the SAN of which the selected SAN object is a member, the zoning information includes information corresponding to each other SAN object through which the selected SAN object is a logical or physical member of the zone, wherein a SAN object is a logical member of a zone via relationship of the SAN object to other SAN objects that are physical members of the zone.

32. The computer readable storage medium as recited in claim 31, wherein the program instructions are further computer-executable to implement:
- accepting user input selecting information corresponding to a particular other SAN object through which the selected SAN object is a logical or physical member of the zone; and
- displaying zoning information for the particular other SAN object in response to the user input, wherein the zoning information for the particular other SAN object indicates one or more zones of the SAN of which the particular other SAN object is a logical or physical member.

33. The computer readable storage medium as recited in claim 29, wherein the program instructions are further computer-executable to implement:
- accepting user input selecting one of the indicated one or more zones of the SAN of which the selected SAN object is a member; and
- displaying zone-centric information for the selected zone in response to the user input, wherein the zone-centric information indicates one or more SAN objects that are members of the selected zone and relationships among the one or more SAN objects that are members of the selected zone.

34. The computer readable storage medium as recited in claim 33, wherein the program instructions are further computer-executable to implement:
- accepting user input selecting one of the one or more SAN objects that are members of the selected zone; and
- displaying zoning information for the user-selected SAN object in response to the user input selecting the SAN object, wherein the zoning information for the user-selected SAN object indicates one or more zones of the SAN of which the user-selected SAN object is a member.

35. The computer readable storage medium as recited in claim 33, wherein the program instructions are further computer-executable to implement displaying the zone-centric information for the zone corresponding to the selected entry in one of graphical format or textual format.

36. The computer readable storage medium as recited in claim 29, wherein the program instructions are further computer-executable to implement displaying zoning information for the selected SAN object in graphical format or textual format.

37. The system as recited in claim 1, wherein the information describing a particular membership of the selected SAN object in the respective zone includes one or more of information identifying the respective zone, information identifying a fabric that includes the respective zone, information identifying a SAN object through which the selected SAN object is a member of the respective zone, and information indicating membership status of the selected SAN object in the respective zone, wherein the membership status indicates one of active and inactive.

38. The SAN as recited in claim 9, wherein the information describing a particular membership of the selected SAN object in the respective zone includes one or more of information identifying the respective zone, information identifying a fabric that includes the respective zone, information identifying a SAN object through which the selected SAN object is a member of the respective zone, and information indicating membership status of the selected SAN object in the respective zone, wherein the membership status indicates one of active and inactive.

39. The method as recited in claim 21, wherein the information describing a particular membership of the selected SAN object in the respective zone includes one or more of information identifying the respective zone, information identifying a fabric that includes the respective zone, information identifying a SAN object through which the selected SAN object is a member of the respective zone, and information indicating membership status of the selected SAN object in the respective zone, wherein the membership status indicates one of active and inactive.

40. The computer readable storage medium as recited in claim 29, wherein the information describing a particular membership of the selected SAN object in the respective zone includes one or more of information identifying the respective zone, information identifying a fabric that includes the respective zone, information identifying a SAN object through which the selected SAN object is a member of the respective zone, and information indicating membership status of the selected SAN object in the respective zone, wherein the membership status indicates one of active and inactive.

* * * * *